United States Patent [19]

Lee

[11] Patent Number: 4,743,770

[45] Date of Patent: May 10, 1988

[54] PROFILE-MEASURING LIGHT PROBE USING A CHANGE IN REFLECTION FACTOR IN THE PROXIMITY OF A CRITICAL ANGLE OF LIGHT

[75] Inventor: Chia S. Lee, Cerritos, Calif.

[73] Assignee: Mitutoyo Mfg. Co., Ltd., Tokyo, Japan

[21] Appl. No.: 909,926

[22] Filed: Sep. 22, 1986

[51] Int. Cl.$^4$ .............................................. G01B 11/24
[52] U.S. Cl. ..................................... 250/560; 356/376
[58] Field of Search ..................... 250/560, 561; 356/1, 356/4, 376, 380, 381

[56] References Cited

U.S. PATENT DOCUMENTS 4,520,388  5/1985  Kellie .................................. 356/376
4,639,140  1/1987  Lerat ...................................... 356/4

FOREIGN PATENT DOCUMENTS 61-6707  6/1984  Japan .

Primary Examiner—David C. Nelms
Assistant Examiner—Stephone B. Allen
Attorney, Agent, or Firm—Parkhurst & Oliff

[57] ABSTRACT

A profile-measuring light probe includes: an illuminator for irradiating a fine spot of light on a subject to be measured; an objective lens for forming an image of the fine spot on an image plane; and a relay lens for converting the light from the fine spot into a generally parallel ray. Further, the light probe includes a window plate constituted by an entrance prism for taking in the generally parallel ray emitted from the relay lens; a flat glass for subjecting the taken-in ray to multiple internal reflections and transmitting the same, and an exit prism for outputting the ray thus transmitted to the outside. The light probe measures the distribution of light quantity of the light emitted from the window plate to thereby measure a profile of the subject to be measured. With the above-described arrangement, it becomes possible for the light probe to perform the measuring through the utilization of a change in reflection factor of a light inciding in the proximity of a critical angle without using a critical angle prism.

17 Claims, 5 Drawing Sheets

PROFILE-MEASURING LIGHT PROBE USING A CHANGE IN REFLECTION FACTOR IN THE PROXIMITY OF A CRITICAL ANGLE OF LIGHT

BACKGROUND OF THE INVENTION

1. Field of the Invention

This invention relates to a profile-measuring light probe, and more particularly, to improvements in a light probe for measuring a profile of a subject to be measured in non-contact therewith by optical means through the utilization of a change in reflection factor in the proximity of a critical angle of a light. The inventive light probe is suitable for use as a probe in a coordinate measuring machine.

2. Description of the Prior Art

There have been popularized coordinate measuring machines, in each of which a subject to be measured, which is rested on a mount, and a probe supported on a main body of machine are relatively moved in a tridimensional manner by a moving mechanism, whereby a relative movement value between the probe and the subject to be measured is detected. This movement value is processed in a predetermined manner by a data processing unit, so that a height, a profile and the like of the subject can be measured.

The probes for the coordinate measuring machines, have been mainly contact-type probes. However, as the subjects to be measured come to cover parts made of thin plastics, clay models and the like, necessity has been voiced for the development of non-contact type probe.

As a consequence, there have heretofore been proposed various non-contact type probes using optical means. However, there has been presented such a problem that the non-contact type probe is coarse in resolution as compared with the contact-type probe.

To improve the resolution, there has been proposed a probe using a critical angle prism utilizing a change in an internal reflection factor in the proximity of a critical angle when the total reflection occurs in a prism. For example, in Japanese Utility Model Kokai (Laid-Open) No. 6707/1986, there is disclosed such a probe that, to improve the resolution, four internal reflections are performed in an critical angle prism.

However, since a light from the subject to be measured is collimated by an objective lens and made to fall directly into a prism, a large critical angle prism with high accuracy is needed, and such a disadvantage is presented that optical parts are expensive. Furthermore, since the critical angle is varied in accordance with the refractive index, such a problem is presented that the refractive index should be accurately measured during the manufacture of the prism. Further, since a change in the distribution of quantity of light in an optical system of the probe to a change in profile of the subject to be measured, i.e. the sensitivity is not yet satisfactorily large, an electric amplitude should be increased to make the resolution fine, and such a problem is presented that electrical noises tend to mix thereinto.

SUMMARY OF THE INVENTION

The present invention has been developed to obviate the above-described disadvantages of the prior art and has as its first object the provision of a profile-measuring light probe capable of utilizing the properties of the internal reflection of the light without using a large critical angle prism with high accuracy.

The present invention has as its second object the provision of a profile-measuring light probe, wherein the sensitivity in the optical system is satisfactorily high and fine resolution is obtainable without increasing the electric amplitude.

To achieve the aforesaid first object, the present invention contemplates in a profile-measuring light probe comprising:

irradiating means for irradiating the subject to be measured with a fine spot of light at an angle of 90° or less;

an objective lens for forming an image of the fine spot in the proximity of an image plane;

a relay lens having the focus on the image plane, for converting a diffused light from the image of the fine spot into a generally parallel ray;

a window plate including an entrance prism having an angle $\beta$, for taking in a generally parallel ray emitted from the relay lens, a flat glass supported at an angle of inclination $\alpha$ and having a refractive index n, for subjecting the taken-in generally parallel ray to multiple internal reflections and transmitting the same, and an exit prism for outputting the generally parallel ray thus transmitted to the outside, with said $\alpha$ and $\beta$ being set to substantially satisfy the following relationship $$\alpha \approx 90° - \arcsin(1/n)$$

$$\beta \approx \arcsin(1/n); \text{ and}$$

a position sensing detector for receiving the generally parallel ray from the window plate, measuring the distribution of quantity of light and outputting the measured result to the outside.

A specific embodiment of the present invention is of such an arrangement that, between the objective lens and the image plane, there are provided a polarizing beamsplitter for reflecting and dividing a light of an S-polarized component normal to the plane of incidence and mainly transmitting therethrough a light of a P-polarized component incorporated in the plane of incidence, and a coarse position sensing detector for measuring a position of an image formed by the light of the S-polarized component thus divided and outputting the measured results to the outside, thereby achieving the second object in addition to the first object.

Another specific embodiment of the present invention is of such an arrangement that, between the fine spot of light and the image of the fine spot, there is provided an interference filter to remove the lights of distrubance, for selecting a light having a specific wavelength within the wavelength region of the lights used by the irradiating means.

A further specific embodiment of the present invention is of such an arrangement that a pin-hole for removing the lights of distrubance is provided on the image plane.

A still further specific embodiment of the present invention is of such an arrangement that the irradiating means is a combination of a laser diode with a focusing lens.

A yet further specific embodiment of the present invention is of such an arrangement that the magnification of the objective lens is about 5 times or less.

A further specific embodiment of the present invention is of such an arrangement that the relay lens is formed of a gradient index lens having a small diameter and a focal length shorter than the focal length of the objective lens.

A further specific embodiment of the present invention is of such an arrangement that the position sensing detector is formed of a lateral effect photodiode.

A further specific embodiment of the present invention is of such an arrangement that the position sensing detector is formed of a CCD or MOS type line sensor.

To achieve the aforesaid second object, the present invention contemplates in a profile-measuring light probe for measuring a profile of the subject to be measured through utilization of a change in reflection factor in the proximity of a critical angle of a light, wherein a light of a P-polarized component incorporated in a plane of incidence is mainly used.

To achieve the aforesaid second object, the present invention contemplates in a profile-measuring light probe comprising:

irradiating means for irradiating a fine spot of light onto a subject to be measured;

an objective lens for gathering the lights from the fine spot and converting the same into a parallel ray;

a light transmitting member for transmitting a light from the objective lens through the internal reflections;

polarization selecting means for mainly transmitting a light of a P-polarized component incorporated in a plane of incidence therethrough to the light transmitting member; and a photo-electric transducer element for receiving the light from the light transmitting member and transducing the same into an electric signal.

A further specific embodiment of the present invention is of such an arrangement that the light transmitting member is formed of a critical angle prism.

A further specific embodiment of the present invention is of such an arrangement that the light transmitting member includes a flat glass supported at a predetermined angle and having a light transmitted therethrough by the internal reflections.

In the profile-measuring light probe according to the present invention, differing from the conventional profile-measuring light probe, wherein a light from a fine spot on the subject to be measured is converted into a generally parallel ray and directly subjected to the internal reflections, an image of a fine spot is produced by an objective lens, the light from the image is converted into a generally parallel ray by a relay lens, and the ray is subjected to the multiple internal reflections in a flat glass. As a consequence, it becomes possible to measure through the utilization of a change in reflection factor of a light inciding in the proximity of a critical angle without using a large critical angle prism with high accuracy. Furthermore, since the long flat glass is used, the number of multiple reflections is increased, differing widely from the conventional case, whereby, even with a small change in position of the fine spot, the distribution of quantity of light varies widely on the position sensing detector, so that the sensitivity in the optical system can be raised, thus enabling the resolution to be finer than the conventional case. Further, since it is easy to finely adjust the inclination angle of the flat glass, the fine adjustment of the inclination angle of the flat glass can be empirically and desirably performed in accordance with the refractive index of the flat glass to select the optimal angle experimentally for example, thus easily achieving the adjustment.

Furthermore, when the P-polarized component is used as the ray made to fall into the flat glass, a change in reflection factor in the proximity of the critical angle is abrupt, so that the resolution can be finer. Use of the P-polarized component as the incident ray makes it possible to improve the resolution and prove effective even when the conventional profile-measuring light probe with no relay lens is used.

Further, when a change in position of the image by the S-polarized component divided by the polarizing beamsplitter is measured by another position sensing detector, measuring of the coarse resolution can be performed, so that both measurements of the coarse and fine resolutions can be conducted.

DESCRIPTION OF THE PREFERRED EMBODIMENT

The preferred embodiment of the present invention will hereunder be described with reference to FIGS. 1 to 5.

Figure 1:
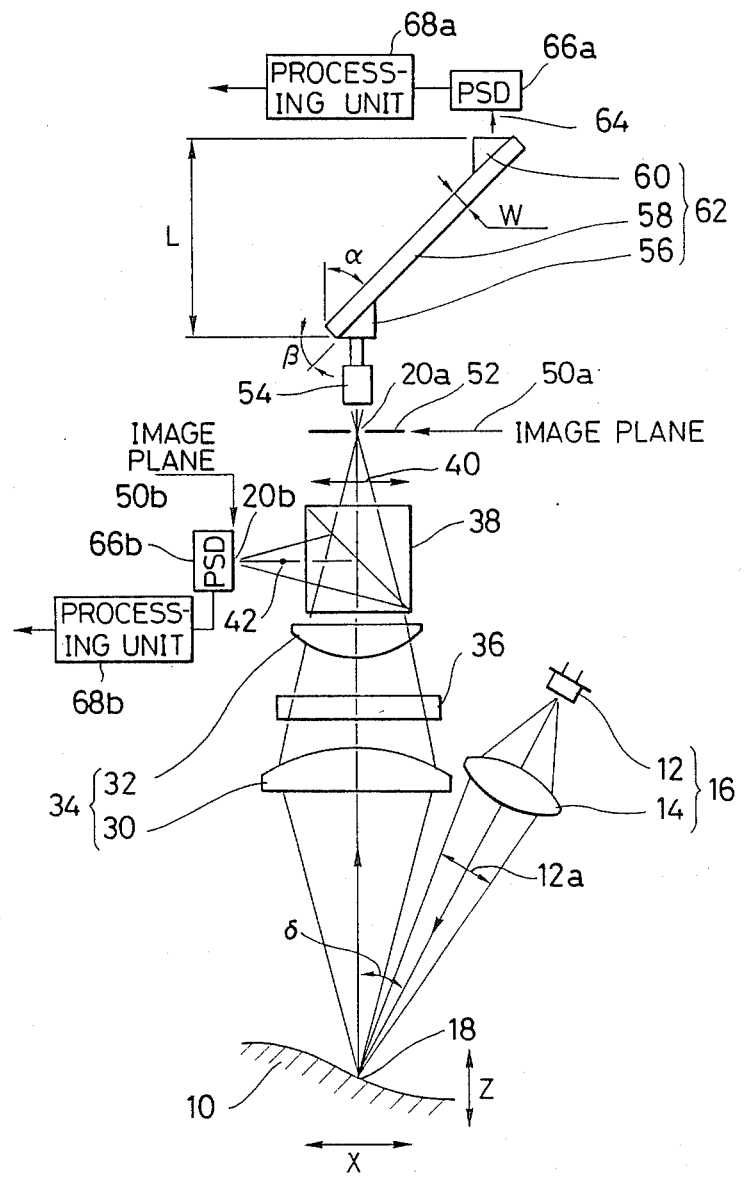
FIG. 1 is a sectional view showing the inner construction of one embodiment of the profile-measuring light probe according to the present invention.

FIG. 1 shows the inner construction of the embodiment of the profile-measuring light probe according to the present invention.

This embodiment includes irradiating means 16 constituted by a laser diode 12 and a focusing lens 14. A fine spot 18 of focussed light is irradiated by the irradiating means 16 onto a subject 10 to be measured, whereby an image 20a of the fine spot 18 is made to focus by an objective lens 34 constituted by lenses 30 and 32. The magnification of this objective lens 34 is 1 to 5 times.

An angle made between an optical axis of the irradiating means 16 and an optical axis of the objective lens 34, i.e. an angle of irradiation δ is set at 90° or less.

The light of the laser diode 12 is linearly-polarized and an electric vector is directed in a direction of 12a, and the polarized state is varied by reflection at the subject 10 to be measured.

An interference filter 36 is provided between the two lenses 30 and 32, which constitute the objective lens. The interference filter 36 transmits therethrough only a light of 780 nanometers as being the wavelength of the laser diode 12, to thereby exclude the lights of disturbance i.e., light from sources other than the laser diode 12.

A polarizing beamsplitter 38 is provided between the objective lens 34 and the image 20a of the fine spot. The polarizing beamsplitter 38 divides the ray into two including the P-polarized component 40 incorporated in the plane of incidence and the S-polarized component 42 normal to the plane of incidence. The reason why this polarizing beamsplitter 38 is used will be described later.

Here, a flat plane normal to the optical axis of the objective lens 34 and including the image 20a of the fine spot 18 when the fine spot 18 is on the optical axis of the objective lens 34 refers to an image plane 50a. This image plane 50a is provided thereon with a pin-hole plate 52 to exclude the lights of distrubance. When the diameter of the fine spot 18 is 25 micrometer and the magnification of the objective lens 34 is 2 times, the diameter of a pin-hole in the pin-hole plate 52 is set at about 500 micrometers.

A relay lens 54 having its focus at this image plane 50a is provided upwardly of the image plane 50a. In the embodiment, there is used a gradient index lens having a diameter as small as 1.5 mm to 2 mm and a focal length considerably shorter than the focal length of the objective lens 34, as the relay lens 54.

Subsequently, a window plate 62 constituted by an incident prism 56 having a small angle $\beta$, a flat glass 58 and an exit prism 60 are supported at an inclination angle $\alpha$. The prism 56, 60 and the flat glass 58 each has a refractive index of about 1.52 and attached and fixed to one another by a glue. The angle $\beta$ is set at about 42° in the proximity of arcsin (1/1.52) as being the critical angle, and the inclination angle $\alpha$ is set at about 48° in the proximity of (90° the critical angle), whereby the ray falling perpendicularly into the incident prism 56 is totally reflected by more than 50%.

The light from the image 20a of the fine spot is converted into a generally parallel ray through the relay lens 54, falls into the incident prism 56, is transmitted through the flat glass 56, repeating the internal reflections, exits to the outside from the exit prism 60 to form the distribution of light quantity 64. This distribution of light quantity is measured by a position sensing detector 66a, passed through a processing unit 68a, and outputted to the outside. When a flat glass having a thickness W of 5 mm and a length L in the direction of height of about 60 mm is used as the flat glass 58, the number of the total reflections is about 16 times.

As the position sensing detector (PSD) 66a, a lateral effect photodiode capable of measuring the center of the distribution of light quantity is used for example. However, a bi-cell photodiode also can be used as the position sensing detector 66a.

On a side surface of the polarizing beamsplitter 38, there is provided a position sensing detector (PSD) 66b for measuring the position of the image 20b of the fine spot 18 by the S-polarized component, and the measured result is outputted to the outside through a processing unit 68b. This position sensing detector 66b refers to a course position sensing detector in a sense that the detector 66b measures the profile of the subject 18 by a coarse resolution as will be described later. As this position sensing detector 66b, there is used a lateral effect photodiode, too.

Figure 2:
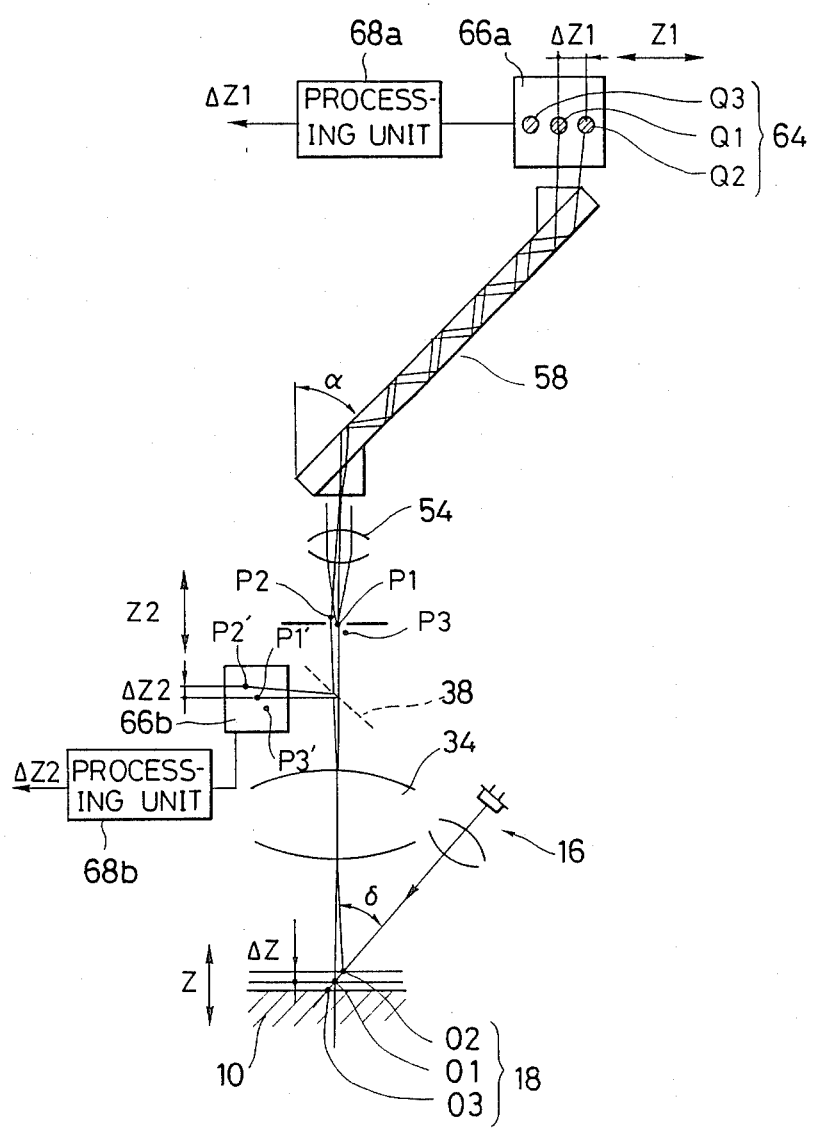
FIG. 2 is a chart in explanation of the state of transmission of the ray in the probe of the above embodiment.

Description will hereunder be given of what change in output occurs when the subject 10 to be measured makes a relative movement in the direction of X-axis, with reference to FIG. 2.

In FIG. 2, a change in profile of the subject 10 to be measured appears as a change in the direction of Z-axis, and, when the angle of irradiation $\delta$ is not zero, the fine spot 18 of light is varied as 01, 02 or 03. Here, if the image of 01 by the objective lens 34 is P1, then the image of 02 becomes P2 and the image of 03 becomes P3. Furthermore, images P1', P2' and P3' are made to focus at positions symmetrical with the polarizing beamsplitter 38.

In this case, the ray of the image P1 is converted into a parallel ray by the relay lens 54, totally reflected through the flat glass 58, and forms a distribution of light quantity Q1 on the position sensing detector 66a. Subsequently, the light of the image P2 is inclined to become a generally parallel ray, whereby, as the multiple reflections are made, the position of the generally parallel ray is greatly deviated to thereby form a distribution of light quantity Q2. As a consequence, when the subject 10 to be measured is displaced by $\Delta Z$ in the direction of Z-axis, on the position sensing detector 66a, the displacement is enlarged to $\Delta Z1$ which is a value proportional to the number of the total reflections in the direction of Z1 axis. As a consequence, when the displacement value $\Delta Z1$ of the center of the distribution of light quantity is outputted from the processing unit 68a, $\Delta Z$ can be calculated by an external processing unit.

At the same time, on the coarse position sensing detectors 66b, the position of the image is varied by $\Delta Z2$ in the direction of Z2 axis. Since this $\Delta Z2$ is of the same order as $\Delta Z$ and the enlarging rate is small, it is convenient when $\Delta Z$ is measured by the coarse resolution in a wide measuring range. As a consequence, the coarse position sensing detector 66b may be omitted.

Figure 3:
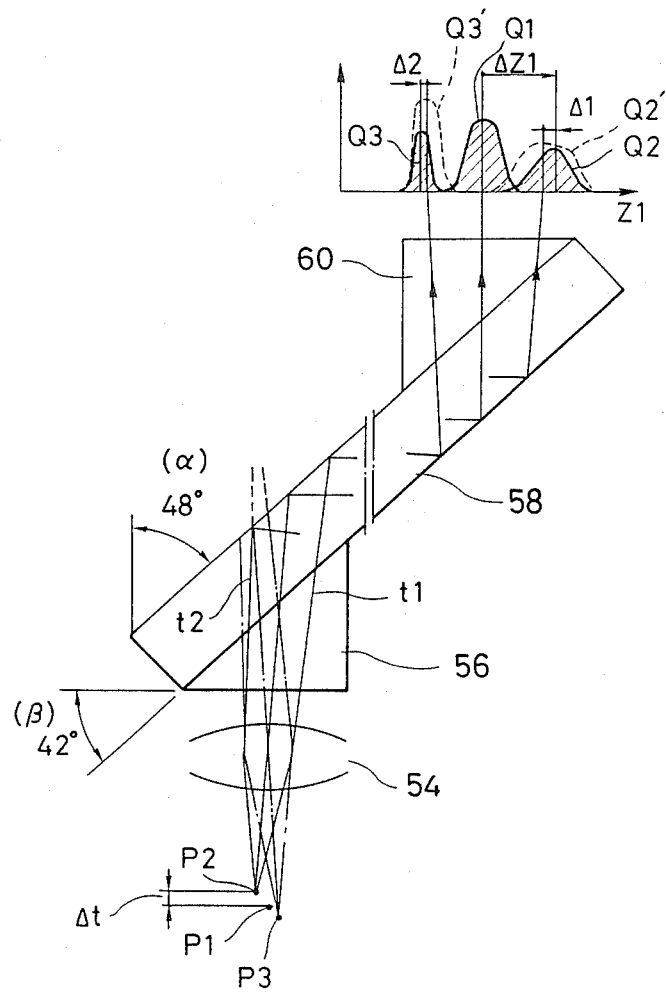
FIG. 3 is a chart enlargedly showing the state of transmission of the ray in the flat glass as shown in FIG. 2.

Description will hereunder be given of the reason why the inclination angle $\alpha$ is set in the proximity of (90°—the critical angle), with reference to FIG. 3. The light from the image P2 is converted into a generally parallel ray by the relay lens 54. However, the image P2 is positioned forwardly of the focus by $\Delta t$, whereby the ray becomes a slightly diffused ray in actuality. In this case, since a ray t1 tends to be totally reflected, the reflection factor thereof becomes high. Whereas, a ray t2 has a small angle of incidence, whereby the reflection factor thereof becomes small, so that the center of the final distribution of light quantity Q2 moves by $\Delta 1$ to the outer side relative to the distribution of light quantity Q2' when the reflection factors of the rays t1 and t2 are equal to each other.

On the contrary, since the light from the image P3 is made to be a slightly focusing ray by the relay lens 54, the center of the final distribution of light quantity Q3 thereof moves by $\Delta 2$ to the outer side relative to the distribution of light quantity Q3' when the reflection factors of the rays are equal to each other. As a consequence, a value in the proximity of (90°—the critical value) is selected as the inclination angle $\alpha$, the sensitivity is raised.

This effect becomes particularly significant when the angle of irradiation $\delta$ shown in FIG. 2 approaches zero and the fine spots 01-03 approach the optical axis, whereby the images P1-P3 of the fine spots approach the optical axis. More specifically, this is because the center of the distribution of light quantity Q2'; shown in FIG. 3, when the reflection factor is not changed by the angle of incidence, approaches the center of the distribution of light quantity Q1, so that a displacement value $\Delta Z1$ of the center of the distribution of light quantity Q2 is approximately determined by the value $\Delta 1$ due to the effect of the critical angle.

Figure 4:
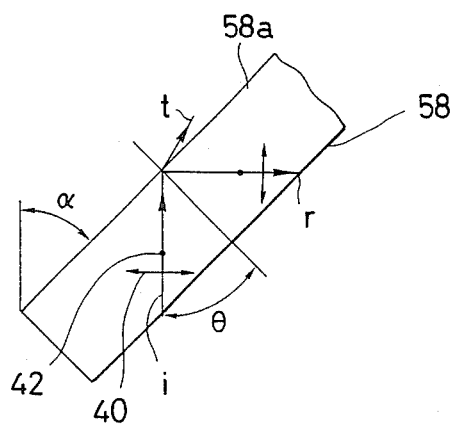
FIG. 4 is a drawing of principle in explanation of the reflection and refraction of the ray.
Figure 5:
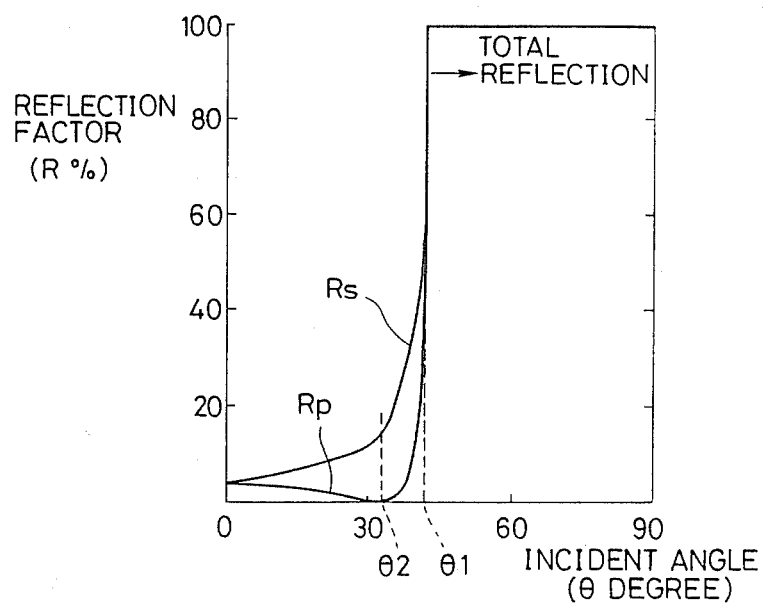
FIG. 5 is a chart showing changes in reflection factor to the incident angles.

Description will hereunder be given of the reason why the polarizing beamsplitter 38 is used in FIG. 1 and the action thereof, with reference to FIGS. 4 and 5.

FIG. 4 shows the state where a ray i falling into a boundary surface 58a of a flat glass 58 having a refractive index n at an angle of incidence $\theta$ is divided into two including a reflected light r and a refracted light t. The incident ray i and the reflected ray r are constituted by a P-polarized component 40 and a S-polarized component 42, respectively. Here, FIG. 5 shows changes in a reflection factor Rp of the P-polarized component 40 and in a reflection factor Rs of the S-polarized component 42 when the angle of incidence $\theta$ is varied. In the drawing, designated at $\theta$ is a critical angle and $\theta 2$ a Brewster angle, which are expressed by the following equations.

$$\theta 1 = \arcsin (1/n) \quad (1)$$

$$\theta 2 = \arctan (1/n) \quad (2)$$

As apparent from FIG. 5, the P-polarized component is larger in change of the reflection factor in the proximity of the critical angle. As a consequence, when only the P-polarized component is selected by the polarizing beamsplitter, the movement values $\Delta 1$ and $\Delta 2$ of the centers of the distributions of light quantity Q2 and Q3 in FIG. 3 become larger, so that the sensitivity of measuring can be further raised and the resolution can be finer. Since the range of measuring becomes shorter substantially in proportion to the resolution, when rough measuring is made by use of the coarse position sensing detector 66b, a highly effective result can be achieved.

Further, when the change in reflection factor in the proximity of the critical angle is utilized, the larger the number of the internal reflections is, the abrupter the effect is amplified. As a result, according to the present invention in which the flat glass 58 shown in FIG. 2 is used, the sensitivity of measuring is highly raised, and finally, the resolution of the order of 0.1 micrometer has been achieved.

Additionally, in the above embodiment, the irradiating means has been formed by combining the laser diode 12 with the focusing lens 14, however, the arrangement of the irradiating means 16 need not necessarily be limited to this, and an arrangement, wherein a visible range emission diode of a high output or a He-Ne laser is used, may be adopted. Furthermore, such an arrangement may be thought of that, in place of the focusing lens, the objective lens is commonly used. Further, such an arrangement may be adopted that a plurality of the irradiating means 16 are provided, whereby the irradiating means is switched in accordance with the inclination of the subject 10 to be measured.

In the above embodiment, as the position sensing detectors 66a and 66b, lateral effect photodiodes capable of measuring the centers of the distributions of light quantity have been used. However, the arrangements of the position sensing detectors need not necessarily be limited to these, a CCD type and MOS type line sensors capable of measuring the distributions of light quantity as they are, may be used.

Further, in the above embodiment, the polarizing beamsplitter 38 and the coarse position sensing detector 66b have been provided, however, when the resolution in the position sensing detector 66a need not be so fine, the polarizing beamsplitter 38 and the coarse position sensing detector 66b may be omitted. In this case, such an arrangement may be thought of that, in place of the polarizing beamsplitter 38, a mere deflecting plate is provided, whereby only the P-polarized component is transmitted to the window plate 62.

Furthermore, it is desirable to set the magnification of the objective lens 34 to about 5 times because the objective lens 34 tends to detect a speckle pattern when the magnification thereof exceeds 5 times or thereabout. However, if the above arrangement is combined with a method of applying electric filtering to an output signal, then the magnification exceeding 5 times may be adopted.

Figure 6:
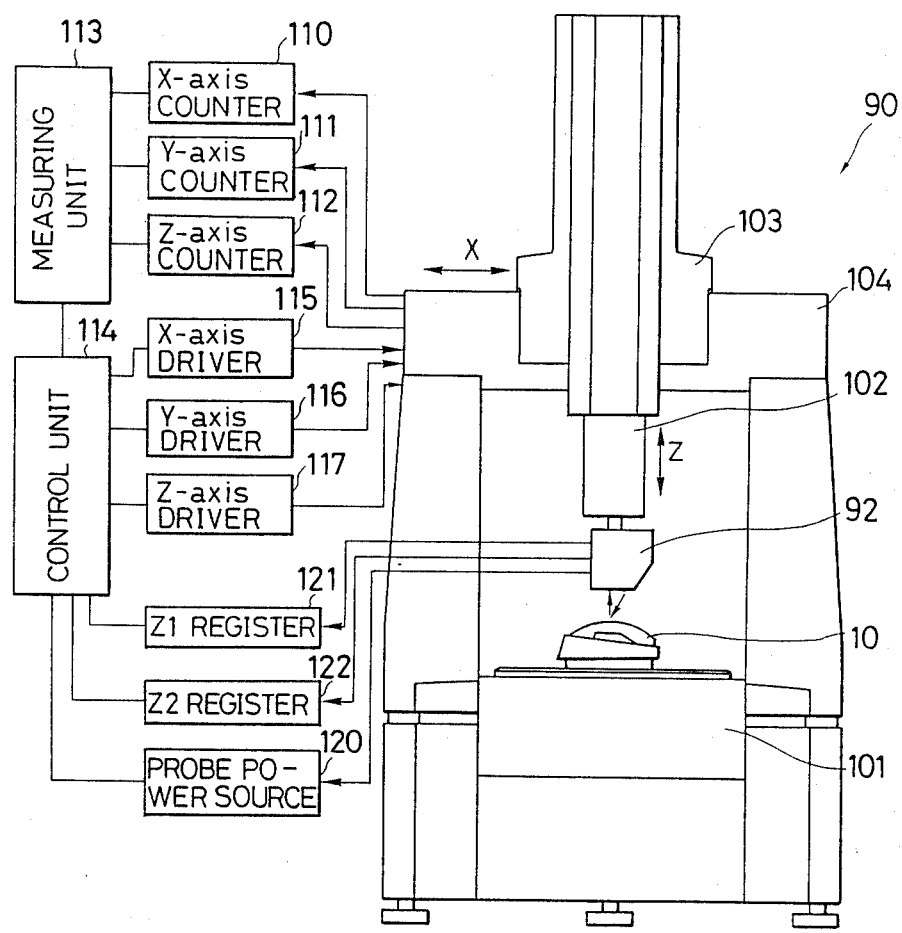
FIG. 6 is a front view, inlcuding a partial block diagram, and showing an example, wherein the profile-measuring light probe according to the present invention is applied to a coordinate measuring machine.

Description will hereunder be given of an example of a system wherein the profile measuring light probe according to the present invention is provided on a coordinate measuring machine as an example of application of the present invention with reference to FIG. 6.

In this system the subject 10 to be measured is rested on a mount 101 of a coordinate measuring machine 90, and a light probe 92 according to the present invention is engaged with the forward end of a spindle 102 of Z-axis, to thereby measure a profile of the subject 10.

Position measuring transducers, not shown, are assembled into the respective axes of a coordinate measuring machine 90, relative movement values between the subject 10 to be measured and the light probe 92 are counted by counters 110, 111 and 112, and calculated by a measuring unit 113.

Furthermore, driving signals for driving motors, not shown, are outputted from a control unit 114 through drivers 115, 116 and 117, so that measuring can be performed fully automatically. Power is supplied from the control unit 114 to the probe 92 through a probe power source 120. Outputted from the light probe 92 to a Z1 register 121 is a movement value $\Delta Z1$ of the center of the distribution of light quantity as an output from the position sensing detector 66a shown in FIG. 2. Furthermore, as an output from the coarse position sensing detector 66b, a movement value $\Delta Z2$ of the image is outputted to a Z2 register 122.

To start the measuring, the spindle 102 of Z-axis is vertically moved, so that, first, a value of the Z2 register 122 reaches substantially zero. Subsequently, the spindel 102 is finely adjusted so that a value of the Z1 register can reach a predetermined tolerance value, and data take-in by the measuring unit 113 is started.

Thereafter, the spindle 102 is vertically moved so that the value of the Z1 register 121 reaches the tolerance value, with a slider 103 being moved in the direction of X-axis. Similarly, a column 104 is moved in the direction of Y-axis. Thus, the entire top surface of the subject 10 to be measured can be scanned and values of Z relative to the respective values of X and Y can be obtained, so that the profile can be measured. When there is a stepped portion on the profile and the value of the Z1 register 121 overflows, the spindle 102 of Z-axis is adjusted so that the value of the Z2 register 122 approaches zero, to make the rough positioning. Subsequently, the value of the Z1 register 121 is used, so that the efficient measuring can be achieved.

The light probe according to the present invention has been described from the point of view of the application thereof to the coordinate measuring machine. However, through the utilization of such a characteristic feature of the light probe according to the present invention that profile-measuring of high resolution can be achieved in non-contact with the subject to be measured, this light probe can be used as the probe for other measuring machines. When used as the probe for a roundness measuring machine for example, this light probe features that no damages are given to the subject to be measured because measuring is made in non-contact therewith, and this light probe can be applied to the subejct made of a soft material quality. Furthermore, there is a possibility of that this light probe can be used as the probe for machines for measuring a thickness of a metallic foil, a thickness of a material of coating and the like.

What is claimed is:

1. A profile-measuring light probe comprising:
   irradiating means for irradiating a subject to be measured with a focussed spot of light at an angle of 90° or less;
   an objective lens for forming an image of the focussed spot in the proximity of an image plane, the objective lens defining an optical axis;
   a relay lens having a focus on the image plane, for converting diffused light from the image of the focussed spot into a generally parallel ray;
   a window plate including an entrance prism having an angle $\beta$ defined between a face of the prism parallel to the image plane and a face of the prism acutely inclined relative to the image plane, the entrance prism taking in a generally parallel ray emitted from relay lens; a flat glass supported at an angle of inclination $\alpha$ defined between an inclined face of the glass and the optical axis and having a refractive index n, for subjecting the taken-in generally parallel ray to multiple internal reflections and transmitting same; and an exit prism for outputting the generally parallel ray thus transmitted to the outside, with said angles $\alpha$ and $\beta$ being set to substantially satisfy the following relationship $$\alpha \simeq 90° - \arcsin(1/n)$$

$$\beta \simeq \arcsin(1/n); \text{ and}$$

a position detector for receiving the generally parallel ray from said window plate, measuring the distribution of light quantity and outputting the measured result to the outside.

2. The light probe as set forth in claim 1, wherein between said objective lens and said image plane, there are provided a polarizing beamsplitter for reflecting and dividing a light of an S-polarized component normal to the plane of incidence and mainly transmitting through the window plate a light of a P-polarized component incorporated in the plane of incidence, and a coarse position sensing detector for measuring a position of an image formed by the light of the S-polarized component thus divided and outputting the measured results.

3. The light probe as set forth in claim 1, wherein, between said focussed spot of light and said image of the focussed spot, there is provided an interference filter for removing disturbing lights by selecting a light having a specific wavelength within a range of wavelengths of light emitted from said irradiating means.

4. The light probe as set forth in claim 1, wherein a pin-hole plate is provided on said image plane for removing disturbing lights by shielding lights that are diverted from said optical axis.

5. The light probe as set forth in claim 1, wherein said irradiating means is a combination of a laser diode with a focusing lens.

6. The light probe as set forth in claim 1, wherein the magnification of said objective lens is about 5 times or less.

7. The light probe as set forth in claim 1, wherein said relay lens is formed of a gradient index lens having a focal length shorter than the focal length of said objective lens.

8. The light probe as set forth in claim 1, wherein said position sensing detector is formed of a lateral effect photodiode.

9. The light probe as set forth in claim 1, wherein said position sensing detector is formed of a CCD or MOS line sensor.

10. The light probe as set forth in claim 2, wherein said position sensing detector is formed of a lateral effect photodiode.

11. The light probe as set forth in claim 2, wherein said position sensing detector is formed of a CCD or MOS line sensor.

12. The light probe of claim 1, including means for transmitting through the window plate a light of a P-polarized component incorporated in a plane of incidence.

13. A profile-measuring light probe comprising:
    irradiating means for irradiating a focussed spot of light onto a subject to be measured;
    an objective lens for gathering lights from said focussed spot and converting same into a parallel ray, the objective lens defining an optical axis;
    a light transmitting member for transmitting a light from said objective lens through internal reflections within said light transmitting member;
    polarization selecting means for transmitting a light of a P-polarized component incorporated in a plane of incidence through said light transmitting member; and
    a photo-electric transducer element for receiving the light from said light transmitting member and transducing the light from said light transmitting member into an electric signal.

14. The light probe as set forth in claim 13, wherein said light transmitting member is formed of a prism having an angle $\beta$ defined between a first face of the prism perpendicular to the optical axis and a second face of the prism acutely inclined relative to the optical axis, the angle $\beta$ being in the proximity of a critical angle of said prism.

15. The light probe as set forth in claim 13, wherein said light transmitting member includes a flat glass supported in an inclined state at a predetermined angle defined between said optical axis and an inclined face of said glass and having light transmitted therethrough by internal reflections.

16. A coordinate measuring machine including a light probe for measuring a profile through the utilization of a change in reflection factor in the proximity of a critical angle of a light, wherein said light probe includes;
    an objective lens for producing an image of a focussed spot of light;
    a relay lens for converting light from said focussed spot into a generally parallel ray; and
    a flat glass for subjecting said ray to multiple internal reflections.

17. The coordinate measuring machine of claim 16, wherein said light probe includes polarizing means for transmitting through the flat glass light of P-polarized component incorporated in a plane of incidence.

* * * * *